Feb. 5, 1946.    A. T. COLWELL    2,394,150
HOLLOW POPPET VALVE
Original Filed Dec. 20, 1941
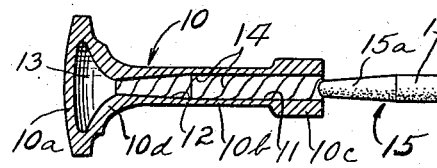
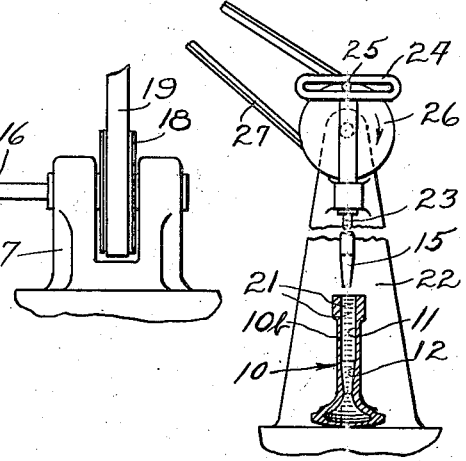
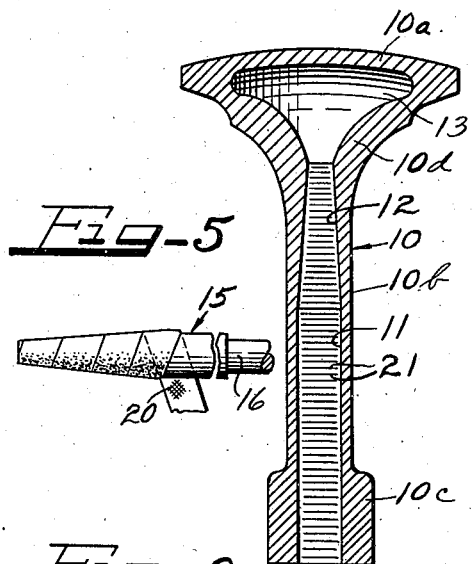
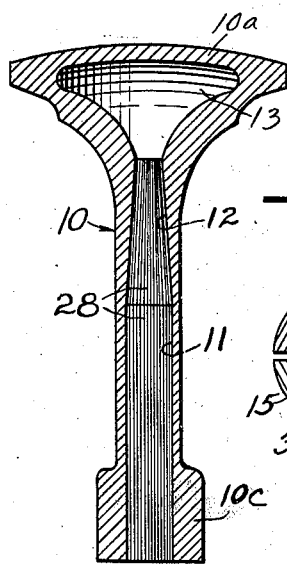
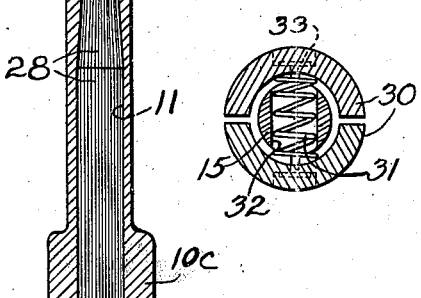
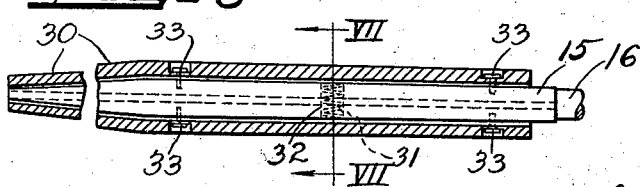
INVENTOR
Archie T. Colwell
by Charles W. Hills Attys Patented Feb. 5, 1946

2,394,150

UNITED STATES PATENT OFFICE

2,394,150

HOLLOW POPPET VALVE

Archie T. Colwell, Cleveland, Ohio, assignor to Thompson Products, Inc., a corporation of Ohio Original application December 20, 1941, Serial No. 423,716. Divided and this application February 21, 1944, Serial No. 523,272

2 Claims. (Cl. 123—188)

This invention relates to polished hollow articles such as hollow poppet valves.

Specifically the invention relates to hollow poppet valves free from circumferential scratches or cracks and containing longitudinally extending scratches as the only defects in the interior stem wall surface thereof.

This application is a division of my copending application entitled: "Method of polishing hollow stem valves," Serial 423,716, filed December 20, 1941, now Patent No. 2,373,459, April 10, 1945.

The interior surface of a hollow poppet valve, especially the interior surface of the stem of such a valve, must be as continuous as possible to resist the formation of fatigue cracks. Therefore elaborate polishing operations are used to remove tool marks or scratches caused by reaming tools or drills in the valve cavities. Such tool marks or scratches are very dangerous since they form fatigue loci during use of the valve resulting, in some instances, in a complete failure of the valve.

Since the valve stem, in operation, is subjected mainly to tensile stresses, circumferential scratches in the stem wall are especially dangerous. Such circumferential scratches can readily form the loci for circumferential cracks in the valve stem because the stem is subjected to axial stresses and shocks as the valve opens and closes in an engine. The repeated pounding at tremendous speeds which the valve stem must undergo in high speed, high compression engines, such as aircraft engines, has greatly increased the potential dangers of such circumferential scratches.

It is highly desirable to make the hollow valve light in weight and with thin walls which will rapidly transfer heat from the coolant which is sealed in such hollow valve. Therefore it is obvious that the valve metal must be made as efficient as possible so as to successfully resist all strains to which it is subjected.

Since the valve stem is subjected to very little forces or stresses tending to radially expand the same, it follows that the stem must be designed to resist the tension stresses and, when so designed, it will not fail because of any radial stresses.

In accordance with this invention the interior wall of a hollow stem valve is subjected to rotary polishing treatments for removing as many tool marks and scratches as possible. The rotary polishing operation, however, even when carried out with extreme care, will leave at least a few circumferential scratches in this interior surface. These scratches may even be of microscopic size but nevertheless they are dangerous as fatigue loci.

In accordance with this invention the rotary polishing operation is followed up with a longitudinal or swabbing polishing operation. This longitudinal swabbing removes circumferential scratches although it may impart axial or longitudinal scratches to the interior stem surface. However, the longitudinal scratches are not dangerous since, as explained above, the valve stem is not subjected to high radial stresses. Thus, while the longitudinal scratches may serve as loci for radial fatigue cracks, they do not form such loci for cracks formed due to axial tension, and their presence is not harmful.

As a result of the invention, therefore, the dangerous circumferential scratches are completly eliminated from the interior of the valve stem and a stronger stem results without requiring thicker stem walls and undesired increase in weight of the valve.

It is, then, an object of this invention to provide hollow stemmed poppet valves which are free from interior scratches which might serve as fatigue loci for cracks developed as a result of axial loading of the valve.

A further object of the invention is to obliterate circumferential scratches in the interior surface of a hollow valve stem and thereby produce a stronger valve.

Another object of the invention is to provide a polished hollow article free from circumferential cracks and scratches, and containing longitudinal scratches as the only defects in the surface thereof.

A further object of the invention is to produce a hollow stemmed poppet valve which only has longitudinally extending scratches in its interior surface.

Other and further objects of the invention will be apparent to those skilled in the art from the following detailed description of the annexed sheet of drawings which, by way of preferred example, illustrates an embodiment of the process.

On the drawing:

Figure 1 is a broken fragmentary side elevational view of a rotary polishing machine for the interior of a hollow poppet valve which is shown in longitudinal cross section;

Figure 2 is a broken fragmentary elevational view of a reciprocating or swabbing type polishing machine to obliterate the circumferential scratches remaining in the valve shown in longitudinal cross-section;

Figure 3 is an enlarged longitudinal cross-sectional view of a poppet valve body after the rotary polishing operation;

Figure 4 is a view similar to Figure 3 illustrating the valve body after the longitudinal or swabbing type polishing operation;

Figure 5 is a fragmentary side elevational view of one form of polishing tool;

Figure 6 is a longitudinal cross-sectional view, with parts in elevation, of another form of polishing tool;

Figure 7 is a transverse cross-sectional view taken along the line VII—VII of Figure 6.

As shown on the drawing:

In Figure 1 of the drawing the reference numeral 10 designates generally a hollow metal poppet valve blank having a hollow head 10a, a hollow stem 10b and an enlarged nubbin 10c at the end of the stem. The stem has a cylindrical bore 11 extending inwardly from the nubbin end thereof and merging into a tapered or conical bore 12 which extends to the head cavity 13 of the hollow head 10a. The tapered bore 12 provides a thickened throat portion 10d for the blank.

The blank 10 can be prepared by forging, for example, as described in the McBride et al. Patent 1,984,751, or by any other suitable process.

In accordance with this invention, the cylindrical bore 11 and tapered bore 12 of the stem 10b are reamed to size with a reaming tool. The reaming tool may leave circumferential or helically extending marks 14 in the interior wall of the stem, which must be removed. For this purpose the valve blank 10 is slipped over a rotating polishing tool 15 sized to snugly engage the walls of the bores 11 and 12. For this purpose the tool 15 has a tapered leading end 15a to engage the wall of the tapered bore 12 and a trailing cylindrical end 15b to engage the wall of the bore 11. The tool 15 is mounted on a horizontal shaft 16 which can be rotatably mounted in a support 17 and driven through a pulley 18 by a driven belt 19.

As shown in Figure 5, the tool 15 is covered with a helically wound strip 20 of abrasive paper or cloth such as emery cloth.

For the first polishing operation a No. 80 emery cloth is used. Such a cloth has abrasive particles sized to pass a screen having eighty openings per linear inch.

The interior of the stem 10b is thus polished in a circumferential direction by the abrasive cloth and, since the tool 15 rotates circumferential scratches will remain in the walls of the bores 11 and 12.

After the interior walls of the stem are polished to remove scratches capable of being removed by a No. 80 abrasive cloth, the tool 15, or another tool, is provided with a finer abrasive cloth, usually having abrasive particles of about No. 120 size. The rotary polishing operation is continued with this finer cloth and may be followed up by a third rotary polishing operation with a still finer abrasive cloth such as a No. 180.

The blank 10, upon completion of the rotary polishing treatment, is polished considerably but, as illustrated in Figure 3, the walls of the bores 11 and 12 still have circumferentially extending scratches 21 remaining therein. These scratches may be of microscopic size, but are still highly detrimental since they can form fatigue loci for cracks when the valve is axially loaded as in operation.

It is, thus, highly desirable to remove the circumferentially extending scratches 21. In accordance with this invention these scratches are removed by a reciprocal or swabbing type polishing operation. The rotary polished blank 10 can be mounted in a polishing machine 22 as shown in Figure 2 and the tool 15 can be driven by a reciprocating shaft 23. The shaft 23 can have a cross head 24 thereon driven by a pin 25 from a driven disk or pulley 26. The pulley 26 is adapted to be driven by a belt 27. The tool 15 will not rotate in the machine 20 but will reciprocate into the bores 11 and 12 of the valve stem 10b.

The tool 15 used for the swabbing type polishing treatment can have an abrasive covering thereon at least as fine or finer than the abrasive used for the last rotary polishing operation.

The reciprocating polishing treatment is continued until all of the circumferentially extending scratches 21 are removed. A valve stem interior as shown in Figure 4 then results. As therein shown the bores 11 and 12 have the walls thereof free from circumferential scratches but containing a plurality of longitudinal or axial scratches 28. These axial scratches will not form loci for cracks developed because of axial tension load on the valve stem. Since the radial load on the valve stem is relatively negligible the longitudinal scratches 28 are immaterial and do not in any way weaken the valve.

In this method of polishing, therefore, the valve stem interior is subjected to successive rotary polishing treatments with abrasive material of progressively increasing fineness. After the last rotary polishing treatment with very fine abrasive material the valve stem interior is further polished in a longitudinal direction with an abrasive at least as fine as the one used in the last rotary polishing step. The longitudinal polishing is continued until all circumferentially extending scratches are removed from the interior wall of the stem.

According to a modified process of this invention the longitudinal polishing operation may alternate with the rotary polishing treatment as long as the last polishing treatment is in a longitudinal direction. For example, the tool marks produced by the reaming or drilling tools in the valve stem can first be treated with a rotating polishing tool carrying abrasive material up to a No. 80 size. This rotary polishing treatment or treatments is then followed by a longitudinal swabbing polishing treatment with a No. 120 abrasive. The longitudinal treatment is then next followed with a rotary treatment with a No. 180 abrasive, and the final treatment can be in a longitudinal direction with a No. 180 abrasive, or even as fine as a No. 320.

Instead of using abrasive cloth on either or both the rotating or reciprocating tools 15, polishing stones carrying abrading particles of the proper size can be used. For example, the tool 15, as shown in Figures 6 and 7, can carry a pair of hollow polishing stones 30 shaped to fit around the end of the tool. These stones 30 are urged outwardly by means of a spring 31 which can extend through a transverse bore 32 in the tool.

Studs 33 can extend through the stones 30 and be threaded into the tool 15. The stones 30 can slide over the studs.

In this spring-urged stone type of polishing tool the stones are resiliently urged apart so that they will snugly engage the walls of the bores 11 and 12 to polish these walls. The stones can be made with abrasive particles of the same fineness described above in connection with the polishing cloth 20.

From the above descriptions it will be understood that this invention now provides stronger hollow stemmed poppet valves by obliterating all circumferentially extending scratches in the inner wall of the valve stem.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. A hollow poppet valve comprising a headed body member having a hollow stem with a straight cylindrical bore extending along the length of the stem from the end thereof and a tapered bore extending from said cylindrical bore into the head cavity, said hollow stem having a relatively thin stem wall with a highly polished interior surface substantially free from circumferentially extending scratches or cracks and containing scratches parallel with the axis of the stem and located in different longitudinal planes.

2. A hollow stemmed poppet valve for high speed high compression engines, said valve having a relatively thin stem wall with a highly polished interior surface devoid of transversely extending scratches of appreciable length and containing scratches parallel with the axis of the stem and located in different longitudinal planes.

ARCHIE T. COLWELL.